United States Patent [19]

Grover et al.

[11] Patent Number: 5,611,521
[45] Date of Patent: Mar. 18, 1997

[54] POWER DRIVE FOR CABLE TIGHTENER

[75] Inventors: Donald D. Grover; Frank W. Randle, both of Kenosha, Wis.

[73] Assignee: Snap-on Technologies, Inc., Crystal Lake, Ill.

[21] Appl. No.: 608,821

[22] Filed: Feb. 29, 1996

[51] Int. Cl.$^6$ ................................................ B25B 25/00
[52] U.S. Cl. ........................................ 254/235; 254/236
[58] Field of Search ................................ 254/229, 230, 254/231, 234, 235, 236

[56] References Cited

U.S. PATENT DOCUMENTS

| | | | |
|---|---|---|---|
| 2,893,689 | 7/1959 | Hepler | 254/230 |
| 3,338,359 | 8/1967 | Baillie et al. | 254/235 |
| 4,157,171 | 6/1979 | Hasselas | 254/231 |
| 4,830,339 | 5/1989 | McGee et al. | 254/236 |
| 4,901,775 | 2/1990 | Scott et al. | 254/231 |

*Primary Examiner*—Katherine Matecki
*Attorney, Agent, or Firm*—Emrich & Dithmar

[57] ABSTRACT

A power drive for an elongated cable tightener having an elongated sleeve and a driven gear wheel supported on the sleeve is provided. The drive includes an outer frame having connected, and laterally spaced, elongated first and second outer side members, each outer side member having first and second ends, the second ends defining aligned outer notches opening longitudinally outward. The drive also includes an inner frame disposed between the first and second outer side members and supported thereby for movement between engaged and open positions, the inner frame having connected and laterally spaced first and second inner side members, each inner side member having first and second ends, the second ends defining aligned inner notches opening laterally outward of the side members, wherein when the inner frame is in the engaged position the inner notches are aligned with the outer notches whereby the sleeve may be disposed in both the inner and outer notches. The drive further includes a drive gear carried by one of the inner and outer frames and engageable with the driven gear to rotate the driven gear, and an actuator coupled to the drive gear for rotating the drive gear.

12 Claims, 3 Drawing Sheets

POWER DRIVE FOR CABLE TIGHTENER

BACKGROUND OF THE INVENTION

1. Field of the Invention

This invention relates to cable tighteners and, more particularly, to power drives for these tighteners.

2. Description of the Prior Art

Turnbuckle assemblies are conventionally used for tightening load binding cables in various fields and also in the marine industry for tightening cables lashing barges to each other and to marine tugboats. Manual turnbuckles used in the marine industry require considerable manual effort and time in order to operate them to properly tighten marine lashing cables. Therefore, inasmuch as numerous lashing cables between a marine tugboat and an adjacent barge, as well as additional lashing cables between additional barges lashed together and to the first-mentioned barge, must be tightened, considerable manual effort and time may be saved through the utilization of a power drive for a cable tightener.

U.S. Pat. No. 4,830,339 to McGee et al. discloses a power drive for coupling to the ratchet wheel of a turnbuckle assembly. This power drive, however, suffers from several problems. This power drive includes a pair of laterally spaced, generally parallel opposite side members having corresponding first and second ends. The first ends define aligned inverted-U-shaped notches formed therein which open laterally outward of the side members in directions disposed generally normal to the longitudinal extent of the side members. When the power drive is engaged with the turnbuckle assembly, these notches lie over and receive the longitudinal central portion of the assembly which has an external gear wheel thereon. The power drive also includes a drive gear disposed between the side members and engageable with the gear wheel of the turnbuckle. The drive gear is connected to a hexagonal head disposed outside one of the side members. An impact wrench is operatively engageable therewith to rotate the drive gear and the engaged turnbuckle gear wheel.

Since the motive means (i.e., the impact wrench) is not permanently attached to the power drive of McGee, the drive is not efficient to use and requires the additional time necessary to find the impact wrench and engage it with the hexagonal head.

Additionally, this drive is not always safe to use. If improperly directed rotary torque is applied by the impact wrench to the hexagonal head, the power drive will be forced upwards and jump off the turnbuckle gear wheel, possibly causing damage or injury.

SUMMARY OF THE INVENTION

It is a general object of the invention to provide an improved power drive for a cable tightener which avoids the disadvantages of prior drives while affording structural and operating advantages.

An important feature of the invention is the provision of an apparatus for driving a cable tightener which is of relatively simple and economical construction.

A further feature of the invention is the provision of an apparatus of the type set forth which aids in preventing injury or damage if the drive is operated incorrectly.

Yet another feature of the invention is the provision of an apparatus of the type set forth which is more efficient and safer to use.

These and other features of the invention are attained by providing a power drive for an elongated cable tightener having an elongated sleeve and a driven gear wheel supported on the sleeve. The drive includes an outer frame having connected, and laterally spaced, elongated first and second outer side members, each outer side member having first and second ends, the second ends defining aligned outer notches opening longitudinally outward. The drive also includes an inner frame disposed between the first and second outer side members and supported thereby for movement between engaged and open positions, the inner frame having connected and laterally spaced first and second inner side members, each inner side member having first and second ends, the second ends defining aligned inner notches opening laterally outward of the side members, wherein when the inner frame is in the engaged position the inner notches are aligned with the outer notches whereby the sleeve may be disposed in both the inner and outer notches. The drive also includes a drive gear carried by one of the inner and outer frames and engageable with the driven gear to rotate the driven gear, and an actuator coupled to the drive gear for rotating the drive gear.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
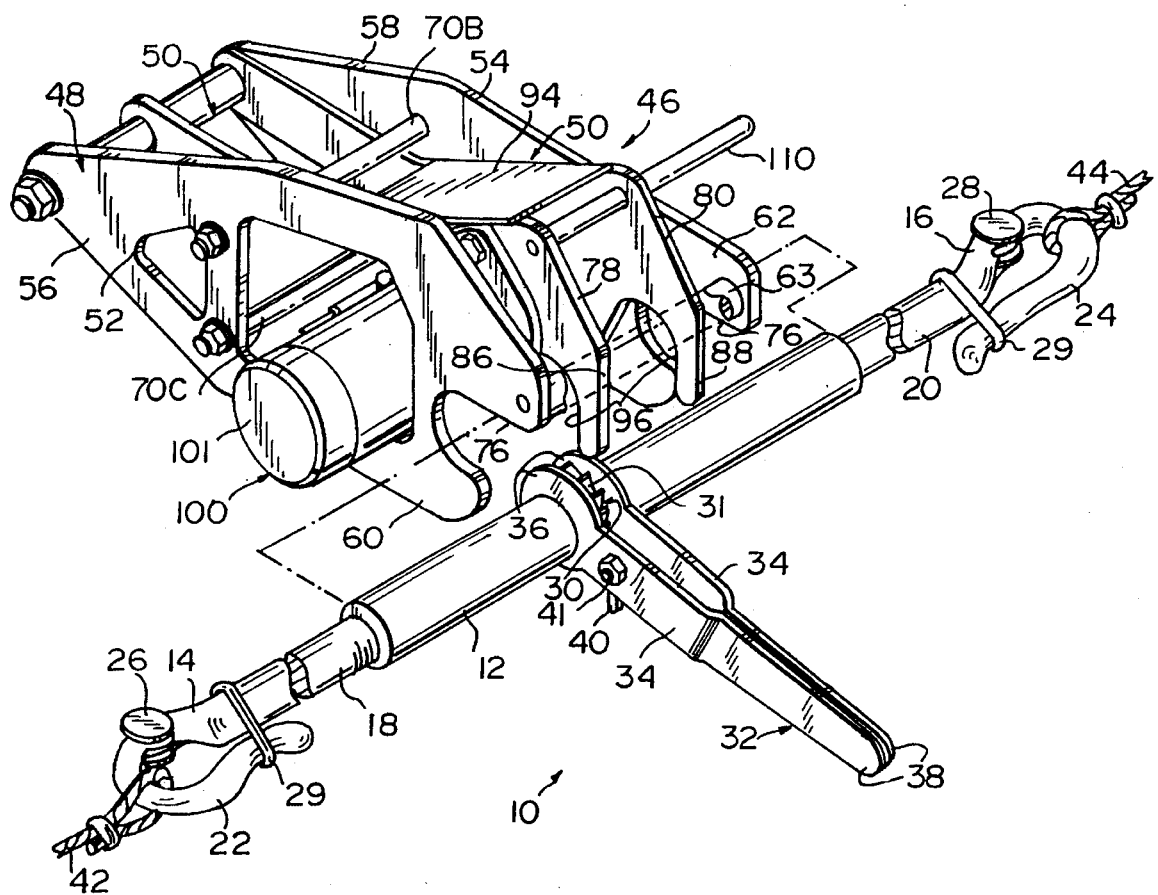
FIG. 1 is a perspective view, partially broken away, of a cable tightener and a power drive constructed in accordance with and embodying the features of the invention, illustrating the inner frame in an open position.

Referring to FIG. 1, the numeral 10 generally designates a conventional form of cable tightener utilized in the marine industry to tighten lashing cables, but which may be used in other environments. The cable tightener 10 is in the form of a turnbuckle assembly including a central cylindrical sleeve member 12, whose opposite ends are oppositely internally threaded. The cable tightener 10 also includes a pair of opposite end hook members 14 and 16 having oppositely threaded shank portions 18 and 20 respectively threadedly engaged in the opposite ends of the sleeve member 12. The hook members 14 and 16 respectively include hook elements 22 and 24 pivotally supported as at 26 and 28 for pivotal movement between open (not shown) and closed positions. Each of the hook elements 22 and 24 may be releasably retained in its closed position by an associated slip ring 29.

The longitudinal central portion of the sleeve member 12 supports an external gear or ratchet wheel 30 having a plurality of teeth 31 and an elongated lever 32 including laterally spaced apart, elongated side plates 34. The side plates 34 include first and second corresponding ends 36 and 38. The ends 36 have openings therein through which the sleeve member 12 is rotatably received closely adjacent and on opposite sides of the ratchet wheel 30. A reversible pawl or ratchet dog 40 is oscillatably supported between longitudinal mid-portions of the side plates 34 through the utilization of a pivot fastener 41, and the ends 38 of the side plates 34 define the handle end of the lever 32. The lever 32 and ratchet dog 40 may be used in conjunction with the ratchet wheel 30 during oscillation of the lever 32 about the sleeve member 12 to rotate the ratchet wheel 30, and thereby the sleeve member 12, in either direction relative to the hook members 14 and 16. Turning of the ratchet wheel 30, functions to draw the shank portions 18 and 20 towards or away from each other and to thus tighten or loosen associated cable sections 42 and 44 joined by the tightener 10, all in a known manner.

Figure 2:
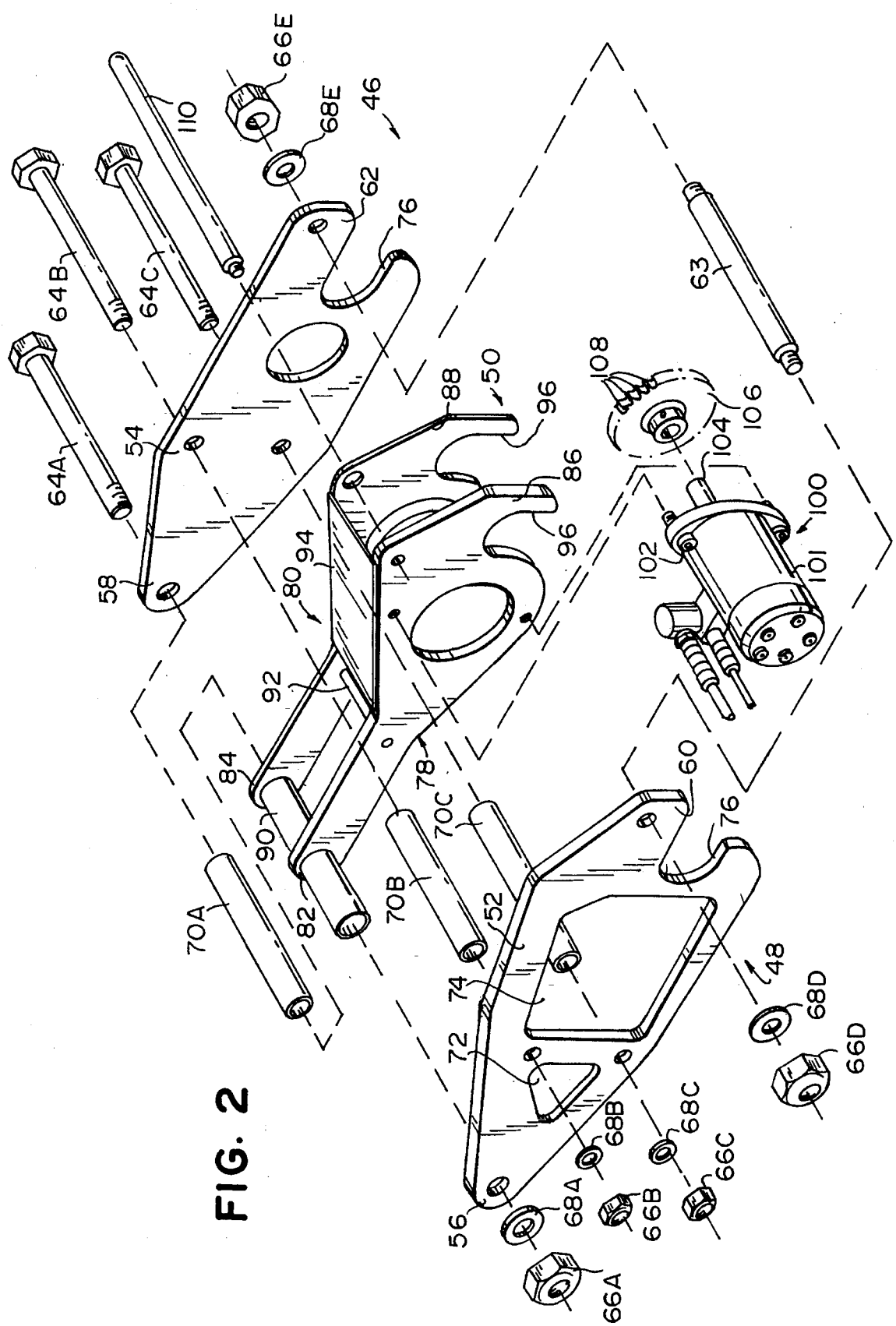
FIG. 2 is an enlarged, exploded, perspective view of the power drive of the present invention.

As seen in FIGS. 1 and 2, a power drive 46 is provided to engage the ratchet wheel 30 of the cable tightener 10 to loosen and tighten the cable sections 42, 44. The power drive 46 includes an outer frame 48 and an inner frame 50. The outer frame 48 includes elongated, laterally spaced apart first and second outer side members 52, 54. The first and second outer side members 52, 54 respectively have first ends 56, 58 and second ends 60, 62. The first and second outer side members 52, 54 are connected together and spaced apart by a bolt 63 threaded at each end, a plurality of headed bolts 64A–C, nuts 66A–E, washers 68A–E and a plurality of tubular spacers 70A–C. Each spacer 70A–C is disposed over the shank of a corresponding bolt 64A–C.

The first outer side member 52 includes a triangular-shaped aperture 72 and a generally quadrilateral shaped aperture 74. The second ends 60, 62 of the first and second outer side members 52, 54 respectively define aligned, U-shaped, outer notches 76 opening longitudinally outward.

As best seen in FIG. 2, the inner frame 50 includes laterally spaced, elongated, clawlike-shaped first and second inner side members 78, 80 respectively having first ends 82, 84 and second ends 86, 88. The first ends 82, 84 are connected together by a tubular bushing 90 welded or otherwise connected thereto. The inner frame 50 further includes a spacer 92 welded to the first and second inner side members 78, 80 and a generally rectangular cover plate 94 welded to lateral ends of the first and second inner side members 78, 80.

As seen best in FIGS. 1–2, the second ends 86, 88 define aligned U-shaped inner notches 96 opening laterally outward in a direction substantially normal to the longitudinal extent of the inner side members 78, 80. The first inner side member 78 also uses a generally circular aperture 98 therethrough.

Figure 5:
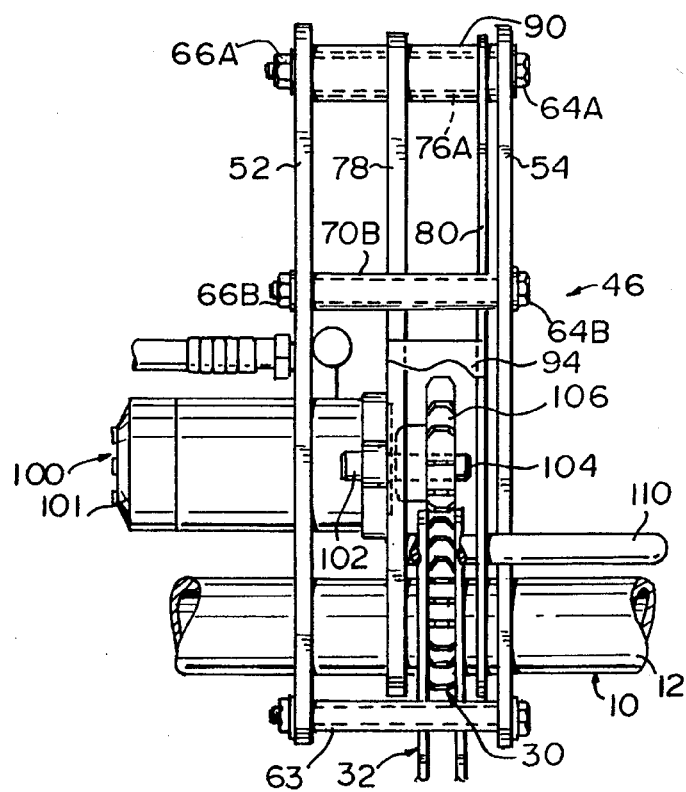
FIG. 5 is a top plan view, partially broken away, of the power drive of FIG. 4.

As seen in FIGS. 1, 2 and 5, the power drive 46 includes a motor 100 having a cylindrical motor housing 101. The motor 100 may be almost any type of reversible motor, including a hydraulic motor used with a hydraulic supply unit (not shown). The motor 100 is attached to the first inner side member 78 of the inner frame 50 by a pair of bolts 102 (one shown) and projects through the aperture 74 of the first outer side member 52. The motor 100 includes a drive shaft 104 (FIGS. 2 and 5) which projects through the circular aperture 98. The drive shaft 104 is connected to a drive gear 106 substantially disposed between the inner side members 78, 80 and under the cover plate 94. The drive gear 106 includes a plurality of involute-shaped teeth 108 engageable, as discussed below, with the teeth 31 of the ratchet wheel 30.

Figure 3:
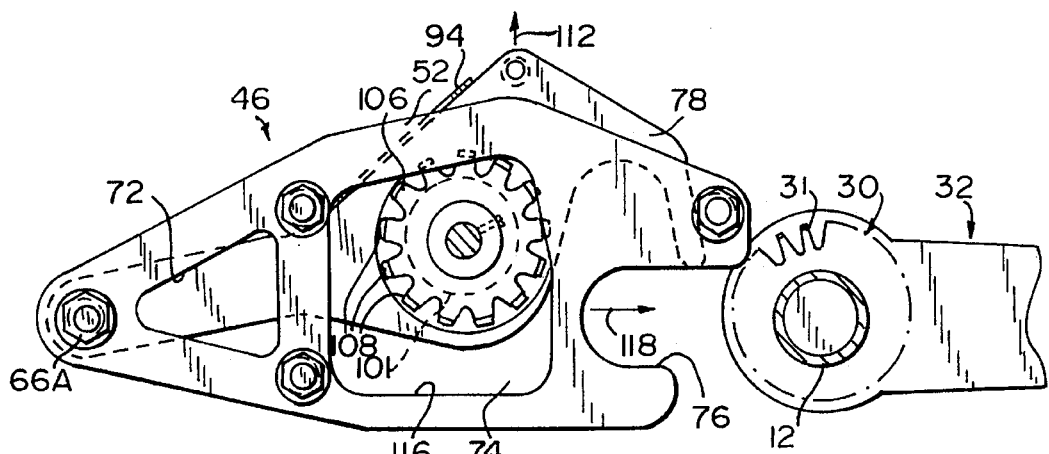
FIG. 3 is a side elevational view, with portions broken away, of the power drive of FIG. 1.

The power drive 46 also includes a rod-like shaped handle 110 welded to the first and second inner side members 78, 80 to facilitate manual movement, as discussed below, of the inner frame 50 between open and closed positions. As discussed in greater detail below, in the open position, as seen in FIGS. 1 and 3, the inner frame 50 is raised to allow the sleeve member 12 to be inserted in the outer notches 76 of the outer frame 48. In the engaged position, the inner frame 50 is lowered to align the inner notches 96 and the outer notches 76 so that the sleeve member 12 is also received in inner notches 96 of the inner frame 50 and the drive gear 106 is disposed in meshing engagement with the ratchet wheel 30.

Figure 4:
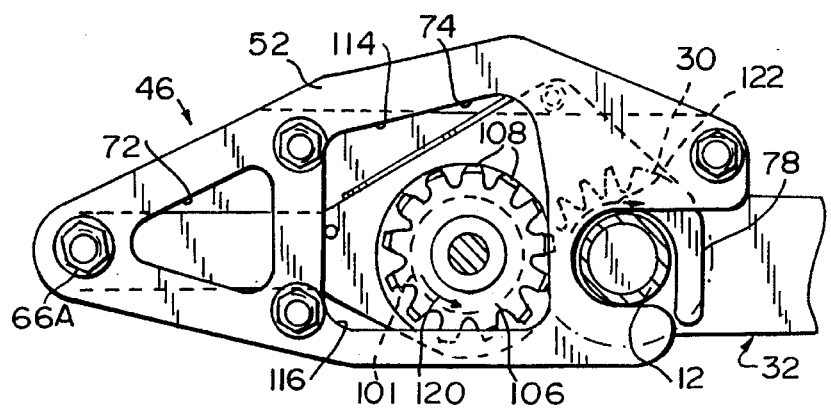
FIG. 4 is a view similar to FIG. 3 of the power drive engaged with the ratchet wheel of the cable tightener.

In that regard, the tubular bushing 90 of the inner frame 50 is disposed about the spacer 70A and the bolt 64A connecting the second ends 56, 58 of the first and second outer side members 52, 54 together. The tubular bushing 90 therefore has an inside diameter slightly greater than the outside diameter of the spacer 70A and allows the inner frame 50 to be pivoted about the bolt 64A and spacer 70A between an open position, as seen in FIGS. 1 and 3, and an engaged position as seen in FIGS. 4 and 5.

The power drive 46 is engaged with the ratchet wheel 30 of the cable tightener 10 as follows: The elongated lever 32 and the ratchet dog 40 are first moved to an out-of-the-way position. A user grasps the first outer side member 52 with his right hand using the triangular-shaped aperture 72 as a hand hold. The user then grasps the handle 110 with his left hand and pulls the inner frame 50 up generally in the direction of arrow 112 shown in FIG. 3.

In this regard, the placement of spacers 70B and 70C and the size and shape of aperture 74 aid in preventing damage to the motor 100 when the inner frame 50 is raised. The aperture 74, as best seen in FIGS. 3 and 4, has an upper end 114 and a lower end 116. The height of the aperture 74, as measured by the distance between the upper end 114 and the lower end 116, is substantially greater than the outside diameter of the motor housing 101. This sizing allows movement of the motor 100 when the inner frame 50 is pivoted between the open and engaged positions shown in FIGS. 3 and 4. The spacers 70B and 70C are also positioned so that the upper and lower ends of first and second inner side members 78, 80 contact the spacers 70B and 70C to limit pivotal movement of the inner frame 50 so as to prevent the motor housing 101 from contacting the upper and lower ends 114 and 116 of the aperture 74.

When the inner frame 50 is raised, access to the U-shaped outer notches 76 is allowed and the power drive 46 can be moved in the direction of arrow 118 (FIG. 3) to place the sleeve member 12 into the outer notches 76. The inner frame 50 is then lowered to the engaged position to place the sleeve member 12 in U-shaped inner notches 96, to align the outer notches 76 with the inner notches 96 and to allow the involute-shaped teeth 108 of the drive gear 106 to mesh with the teeth 31 of the ratchet wheel 30 (see FIGS. 4 and 5). The motor 100 is then engaged to rotate the motor shaft 104 and the drive gear 106, which causes the ratchet wheel 30 to rotate to either loosen or tighten the cable section ends 42, 44 by moving the shank portions 18, 20 toward or away from each other.

It is an important aspect of the present invention that the sleeve member 12 is disposed in two pairs of notches 76, 96 that open in directions that are substantially perpendicular to each other when the inner frame 50 is in the engaged position. If the power drive 46 is engaged with the cable tightener 10 in the manner illustrated in FIG. 4 and the drive gear 106 is turned in the direction indicated by the arrow 120, the sleeve member 12 will be rotated in the direction indicated by the arrow 122 to tighten the cable ends 42 and 44. Furthermore, the application of rotary torque by the motor 100 to the driven gear 106 in the direction of the arrow 120 will result in the second ends 86, 88 of the inner side members 78, 80 being downwardly displaced such that the sleeve member 12 will be maintained tightly seated in the inner notches 96. If, however, a user mistakenly causes the motor 100 to be engaged to rotate the drive gear 106 in a direction opposite arrow 120, the inner frame 50 will move or jump upwards toward the open position causing the sleeve member 12 to no longer be disposed in the inner notches 96. However, since the sleeve member 12 is still disposed in the outer notches 76, the power drive 46 is prevented from moving or jumping very far, thereby preventing personal injury or damage to objects nearby the power drive 46.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A power drive for an elongated cable tightener having an elongated sleeve and a driven gear wheel supported on the sleeve, the drive comprising:

an outer frame having connected, and laterally spaced, elongated first and second outer side members, each outer side member having first and second ends, the second ends defining aligned outer notches opening longitudinally outward;

an inner frame disposed between the first and second outer side members and supported thereby for movement between engaged and open positions, the inner frame having connected and laterally spaced first and second inner side members, each inner side member having first and second ends, the second ends defining aligned inner notches opening laterally outward of the side members, wherein when the inner frame is in the engaged position the inner notches are aligned with the outer notches whereby the sleeve may be disposed in both the inner and outer notches;

a drive gear carried by one of the inner and outer frames and engageable with the driven gear to rotate the driven gear; and an actuator coupled to the drive gear for rotating the drive gear.

2. The power drive of claim 1, wherein the inner and outer notches are generally U-shaped.

3. The power drive of claim 2, wherein the inner notches open in a direction substantially normal to the longitudinal extent of the inner side members.

4. The power drive of claim 1, wherein the actuator is carried by the inner frame.

5. The power drive of claim 4, wherein the actuator includes a motor mounted to one of the inner side members.

6. The power drive of claim 5, wherein the motor is a hydraulic motor.

7. The power drive of claim 5, wherein the motor is disposed on the first inner side member, the drive gear is disposed between the first and second inner side members, and the first outer side member includes an aperture having a height greater than the largest transverse dimension of the motor, and wherein a portion of the motor extends through the aperture, whereby the motor is free to move in the aperture when the inner frame is pivoted between the engaged and open positions.

8. The power drive of claim 1, wherein the first ends of the outer side members are connected by a connecting member and the inner frame is pivotable about the connecting member.

9. The power drive of claim 8, and further comprising a handle connected to either the first or second inner side member for manually pivoting the inner frame between the engaged and open positions.

10. The power drive of claim 1, wherein the drive gear includes a plurality of involute shaped teeth.

11. The power drive of claim 1, wherein the inner and outer notches open in different directions.

12. The power drive of claim 11, wherein when the inner frame is in the engaged position, the inner notches open in a direction substantially perpendicular to the direction the outer notches open.

* * * * *